Aug. 17, 1926.

D. S. DE LAVAUD

FREE WHEEL CLUTCH

Filed July 7, 1924

Inventor.

Dimitri Sensaud de Lavaud by H. J. S. Dennison
atty.

Patented Aug. 17, 1926.

1,596,599

UNITED STATES PATENT OFFICE.

DIMITRI SENSAUD DE LAVAUD, OF PARIS, FRANCE.

FREE-WHEEL CLUTCH.

Application filed July 7, 1924, Serial No. 724,612, and in France February 18, 1924.

The principal object of this invention is to enhance the functioning of a free wheel device which utilizes gripping members formed with eccentrically curved surfaces.

The principal feature of the invention consists in the application of spring pressure to hold eccentric gripping surfaces in engaging contact with the concentric surfaces of the clutch, such spring pressure being applied by the arrangement of a cage member having equally spaced transverse elements co-operating with the eccentrically surfaced members and supporting springs to apply pressure to the eccentrically surfaced members.

Figure 1:
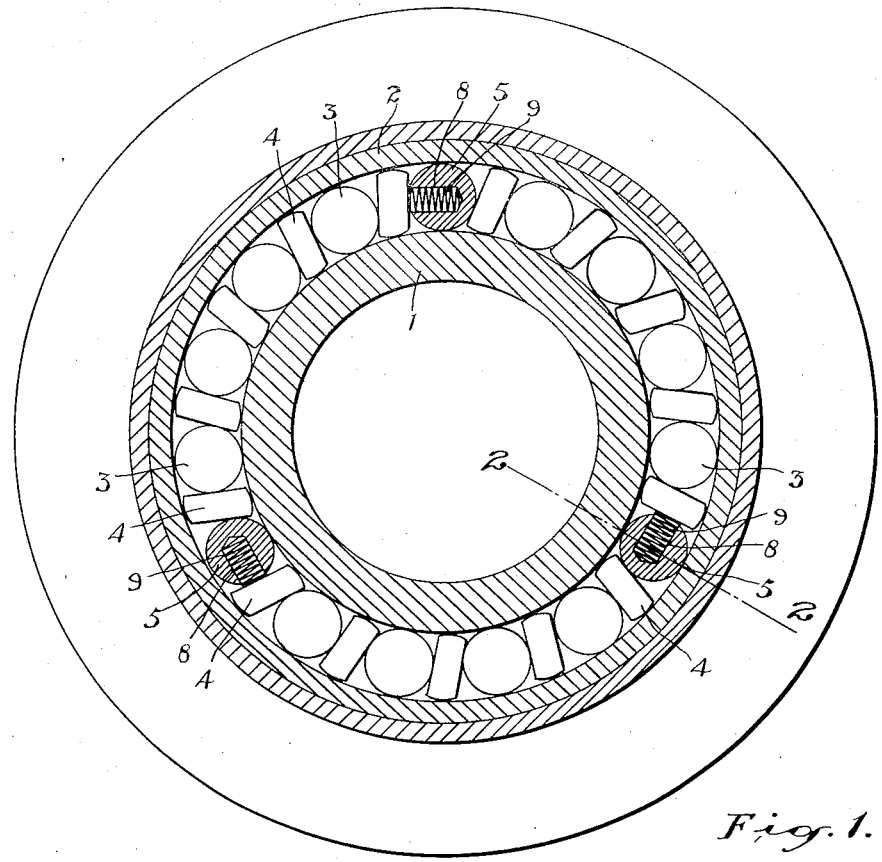

In the drawings, Figure 1 is a transverse sectional view of a free wheel structure constructed according to the present invention.

Figure 2:
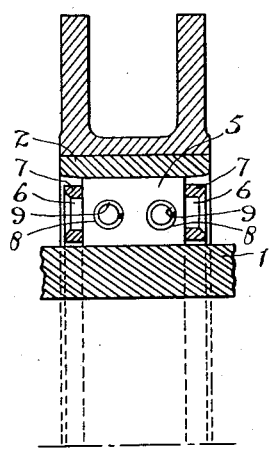

Figure 2 is an enlarged cross sectional view taken on the line 2—2 of Fig. 1, through the bearing rings showing one of the cage spacing elements in elevation.

In my co-pending application, Serial Number 638,940 which has matured into Patent No. 1,542,040, granted June 16, 1925, I have disposed a free wheel clutch mechanism in which two continuously concentric surfaces co-operate with a plurality of prism members having eccentrically disposed surfaces which bind between two cylindrical surfaces and these prisms are spaced apart by cylindrical or roller members.

According to the present invention a cage is provided to hold the rollers in place and the connecting elements of the cage take the place of certain of the intermediary roller members.

In the construction shown the central sleeve member 1 is surrounded by the ring member 2 which is spaced therefrom by the roller members 3 and between the roller members are arranged the clutch prisms 4. Arranged at equally spaced intervals and taking the place of certain of the rollers are the pins 5 which are formed with reduced end members 6 to which are secured cage rings 7 which hold the pins in a definite relative position.

The pins 5 are each formed with a pair of recesses 8 arranged substantially tangential or in right angular relation to the radius of the sleeve and ring members and in these recesses are located the spiral springs 9. These spiral springs engage the adjacent prisms at a point beyond the axis thereof and exert a pressure against the prisms to hold them in the direction of engagement with the sleeve and ring.

The pressure exerted by the springs on the prisms adjacent to the cross pins 5 is such as to hold the other prisms in each section in the position of engagement through the successive prisms being engaged by the rollers outward of their axes and pivoted against the point of contact against the other adjacent roller inward of their axes, consequently there will be no lost motion in the operation of the clutch and even if the conditions under which the prisms are operating are such that the spring pressure will not be transmitted to all of the prisms, at least those in direct engagement with the springs will be held in constant contact with the driving and driven members and as the pin members 5 are arranged equidistant around the circumference of the clutch, the said clutch will always centre properly.

Another feature of importance is connection with the present construction is that the prisms and rollers will, by reason of the rigidity of the cage structure formed by the pins 5 and rings 7, be retained in a condition of parallelism with the axis so that the axes of all the prisms will be maintained parallel with the axis of the driving and driven members and their engagement with the cylindrical surfaces will therefore be maintained at all times throughout their entire length.

What I claim as my invention is:—

1. In a free wheel clutch, the combination with a pair of spaced concentric surfaces and members arranged therebetween having eccentrically curved surfaces, of means supported in a fixed circumferential relation for applying spring pressure to said eccentric members at a point outside their turning axes to hold the eccentric surfaces in constant engaging contact with said concentric surfaces.

2. In a free wheel clutch, the combination with a pair of spaced concentric surfaces and members arranged in groups therebetween having eccentrically curved surfaces, said members being spaced by roller members, of means arranged at regularly spaced intervals around the concentric surfaces for applying spring pressure to each intervening group of eccentric members independent of the remaining groups to hold them in constant engaging contact with said concentric surfaces.

3. In a free wheel clutch, the combination with a pair of spaced concentric surfaces and members arranged therebetween having eccentrically curved surfaces, of spring means arranged at regular intervals around the concentric surfaces for holding the eccentric members in constant engaging contact with said concentric surfaces and means ensuring exact centering of the clutching pressure.

4. In a free wheel clutch, the combination with a pair of spaced concentric surfaces and a plurality of prism members having eccentric surfaces and spacing rollers between said prisms, of a plurality of pins extending transversely between said prisms at intervals, means for holding said pins rigidly spaced, and springs arranged in said pins and exerting pressure on said prisms to hold them in constant engaging contact with the concentric surfaces.

5. In a free wheel clutch, the combination with a pair of spaced concentric surfaces and a plurality of prism members having eccentric surfaces and spacing rollers between said prisms, of a plurality of pins extending transversely between said prisms at intervals, rings rigidly secured to said pins and holding them equally spaced and parallel, and springs secured in said pins and exerting spring pressure on said prisms outward of their individual axes.

6. In a free wheel clutch, a pair of spaced concentric members, a plurality of pins rigidly spaced and arranged loosely between said concentric members, prisms having eccentric curved surfaces engaging the concentric members and spaced apart between said pins, rollers arranged between and spacing said prisms, and coil springs extending from one side of the pins and engaging the adjoining prisms to hold the prisms in constant engaging contact with the concentric members.

DIMITRI SENSAUD DE LAVAUD.